United States Patent

[11] 3,584,159

[72] Inventors Yoshio Tawara
Osaka;
Hozumi Hirota, Nara; Yasumasa Komatsu,
Osaka, all of, Japan
[21] Appl. No. 749,855
[22] Filed Aug. 2, 1968
[45] Patented June 8, 1971
[73] Assignee Matsushita Electric Industrial Co., Ltd.
Osaka, Japan
[32] Priority Feb. 26, 1968, Feb. 27, 1968
[33] Japan
[31] 43/15002 and 43/15676

[54] MAGNETIC HEAD
6 Claims, 7 Drawing Figs.

[52] U.S. Cl. .......... 179/100.2
[51] Int. Cl. .......... G11b 5/14, G11b 5/22
[50] Field of Search .......... 179/100.2 C; 340/174.1 F; 346/74 MC

[56] References Cited
UNITED STATES PATENTS

| | | | |
|---|---|---|---|
| 3,171,903 | 3/1965 | Wheeler et al. | 179/100.2 |
| 3,303,292 | 2/1967 | Bedell et al. | 179/100.2 |
| 3,440,360 | 4/1969 | Sagaya | 179/100.2 |

*Primary Examiner*—Bernard Konick
*Assistant Examiner*—Robert S. Tupper
*Attorney*—Wenderoth, Lind and Ponack

ABSTRACT: A magnetic head assembly having a pair of pole pieces defining a nonmagnetic gap, and a ferrite yoke which has a winding wound thereon and an airgap. The yoke is in the shape of a modified cylinder. A part of the normal cylinder is cut off along an oblique flat plane to form said modified cylinder and the area of the top end flat plane is smaller than that of the bottom end flat plane. The line of the intersection of said oblique flat plane and the bottom end flat plane either does not cross the inner periphery of said normal cylinder or crosses the inner periphery so that the crossed part of the inner periphery does not exceed the width of said airgap. The airgap is positioned along with the mirror-symmetry plane of said modified cylinder so as to include the center point of said line of intersection, and said pair of pole pieces is attached to said oblique plane of said yoke in such a way that said nonmagnetic gap is essentially in said mirror-symmetry plane.

INVENTORS
YOSHIO TAWARA
HOZUMI HIROTA
YASUMASA KOMATSU
BY
Wenderoth, Lind & Ponack
ATTORNEYS INVENTORS
YOSHIO TAWARA
HOZUMI HIROTA
YASUMASA KOMATSU
BY
Wenderoth, Lind & Ponack
ATTORNEYS

MAGNETIC HEAD

DETAILED DESCRIPTION OF THE INVENTION

This invention relates to a magnetic head assembly characterized by a high reproducing output voltage and more particularly to a magnetic head assembly comprising a ferrite yoke having a modified cylindrical form.

A composite type conventional magnetic head comprises a pair of pole pieces defining a nonmagnetic gap and a ferrite yoke which has a winding thereon.

Such a magnetic head has superior pole piece wear resistance, but does not have an entirely satisfactory output voltage as compared with a magnetic head composed of a single ferrite body having both pole pieces and a magnetic yoke.

Therefore, it is desirable to provide a composite type magnetic head which is superior both with respect to the reproducing output voltage and wear resistance.

An object of the invention is to provide a magnetic head assembly having a high output voltage and a high abrasion resistance.

Another object of the invention is to provide a magnetic head assembly comprising a ferrite yoke having a modified cylindrical form and which is capable of producing a high and stable reproducing output voltage.

It has been discovered according to the invention that a high output voltage can be obtained from a magnetic head when a ferrite yoke having a modified cylindrical form with an oblique plane has attached to said oblique plane a pair of pole pieces having a nonmagnetic gap.

The invention will be described in greater detail in the following specification, taken together with accompanying drawings wherein.

Figure 1:
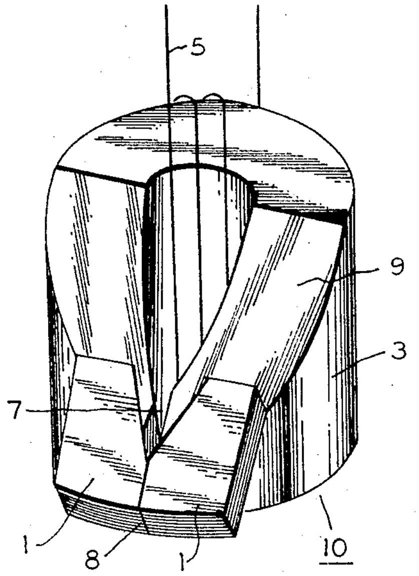
FIG. 1 is a perspective view of a magnetic head assembly according to the invention.

Referring to FIG. 1, reference character 10 designates, as a whole, the magnetic head assembly of the invention. A pair of pole pieces 1 defining a nonmagnetic gap 8 is attached to an oblique flat plane 9 of a ferrite yoke 3 having an airgap 7. A winding 5 is wound on said ferrite yoke 3.

It is important for obtaining a high output voltage that said yoke 3 have the shape of modified cylinder.

Figure 2B:
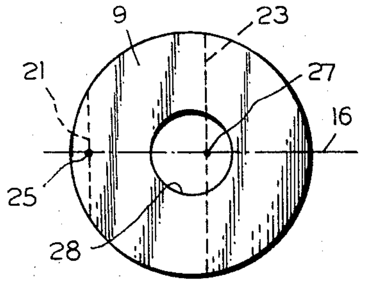
FIGS. 2A and 2B are a vertical cross-sectional view and a top view of a cylindrical ferrite body for use as the ferrite yoke of the magnetic head according to the invention.
Figure 2A:
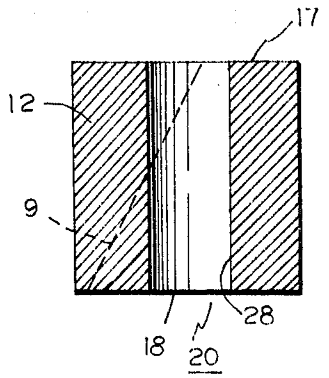

Referring to FIG. 2A, reference character 20 designates, as a whole, an annular right circular cylinder of ferrite having an outer periphery which is approximately circular in form and an approximately circular inner periphery concentric therewith and defining an axial center bore.

A part 12 of such a cylinder is cut off along an oblique flat plane 9 which intersects said inner periphery, so that the remainder of the cylinder has a top flat plane surface 17 smaller in area than that of the bottom flat plane surface 18.

Referring to FIG. 2B, reference character 16 designates the symmetry plane which divides said remainder of the cylinder into two identical parts which are mirror-symmetrical with respect to each other. Said symmetry plane 16 includes a center point 25 of line 21 defined by the intersection of said oblique plane 9 and said bottom plane surface 18, and includes a center point 27 of line 23 defined by the intersection of said oblique plane 9 and said top plane surface 17. Said line 21 crosses the bottom plane surface 18 between a first point which lies between the inner and outer peripheries and a second point which lies inwardly of the inner periphery 28 at the portion where the airgap is to be located a distance which does not exceed the width of the airgap 7, i.e. 0.1 to 3 mm. The line 23 crosses the top plane surface 17 between a first point which lies between the axis of the center bore and the inner periphery of the opposite side of the axis from the airgap, and a second point between the inner and outer peripheries.

Figure 3:
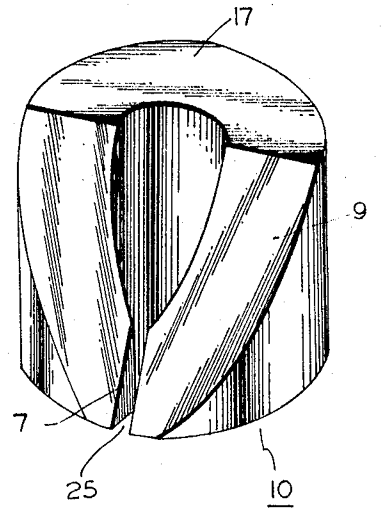
FIG. 3 is a perspective view of a ferrite yoke having a modified cylindrical form in accordance with the invention.

Referring to FIG. 3, wherein similar reference numbers designate components similar to those of FIG. 1 and FIG. 2, said airgap 7 is positioned along said symmetry plane 16 so as to include said center point 25.

Referring again to FIG. 1, said pair of pole pieces 1 is attached to said oblique plane 9 of said yoke in such a way that said nonmagnetic gap 8 is essentially along said symmetry plane 16.

It is preferable that said center point 25 be positioned in the vicinity of the inner periphery of said bottom plane surface 18.

It is important that said normal cylinder have a height larger than one-half the outer diameter thereof. It is preferred that said normal cylinder have a shape in which the ratio of said height to said diameter ranges from one-half to 2.

Figure 4A:
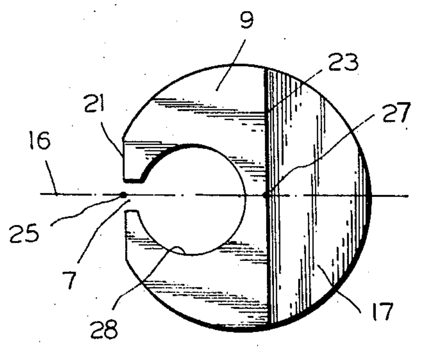
FIGS. 4A and 4B are a vertical cross-sectional view and a top view of a modified yoke according to the invention.
Figure 4B:
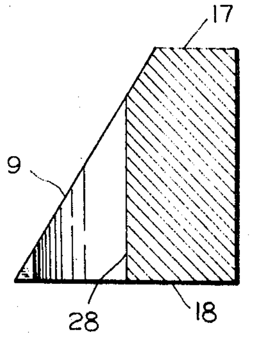

Referring to FIG. 4, wherein similar reference numbers designate components similar to those of FIG. 1, FIG. 2 and FIG. 3, the center bore defined by said inner periphery 28 is eccentric to the axis of the cylinder, being offset along said symmetry plane 16 toward said center point 25. The line 23 lies between the inner and outer peripheries. This modification of the yoke shape brings a further improvement of the output voltage of the magnetic head of the invention.

Said pair of pole pieces 1 can be made of any available and suitable ferromagnetic materials, preferably a ferromagnetic metallic alloy such as Fe-Al, or Fe-Al-Si.

A magnetic head assembly according to the invention produces an optimum output voltage and has excellent abrasion resistance when said pair of pole pieces 1 are made of a ferromagnetic metallic alloy consisting essentially of 55 to 60 mol percent Co, 12 to 16 mol percent Fe, 0 to 6 mol percent Al, 0 to 5 mol percent Sn and 19 to 23 mol percent B.

A ferrite yoke can be formed into the desired cylindrical form by a per se well-known method by employing a ferrite having a high permeability at high frequencies such as Mn-Zn ferrite and Ni-Zn ferrite. Said cylinder can be cut off along the oblique plane and is provided with an airgap by a per se well-known machining technique.

Said pair of pole pieces is attached to said oblique plane with a conventional bonding means such as an adhesive resin.

The invention will be further explained by the following specific examples.

A ferrite yoke has the following specifications with reference to the foregoing description:

Ferrite Yoke

| | |
|---|---|
| Composition | Mn-Zn ferrite |
| Outer diameter | 4 mm |
| Inner diameter | 1.5. mm |
| Height | 4 mm |
| Center point 25 of line 21 | at the vicinity of inner periphery |
| Air gap width | 0.5 mm |

A pair of pole pieces have the following specifications:

| | |
|---|---|
| Composition | 56.2 mol % Co<br>15.2 mol % Fe<br>3.14 mol % Al<br>3.91 mol % Sn<br>29.45 mol % B |
| Air gap width | 1 μm |
| Air gap depth | 30 μm |
| Track width | 0.5 mm |

Said pair of pole pieces and said ferrite yoke are assembled to form a novel magnetic head assembly as set forth in the foregoing description.

A winding is placed around the yoke and has a number of turns such that the inductance of the head is about 60 μH.

Figure 5:
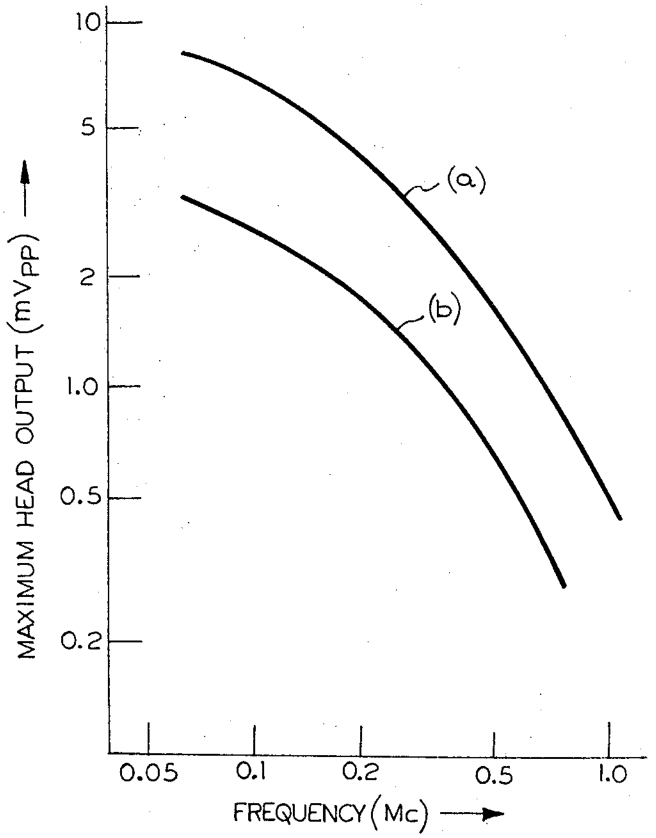
FIG. 5 is a graph of a comparison of the magnetic head characteristics of the novel magnetic head of the present invention with the characteristics of a conventional magnetic head.

Maximum head output voltage for a tape speed of 1.9 m./sec. is shown by the curve (*a*) of FIG. 5 as a function of frequency.

The same composition ferrite as above is fabricated into a ferrite yoke having a shape described, for example, page 653, Journal of the SMPTE, Vol. 65, Dec. 1956, and has the same pole pieces as above secured thereto. Care should be taken that the inductance value of the thus constructed conventional head is adjusted to about 60 μH by providing the proper number of turns of the winding.

The performance of such a conventional magnetic head is shown by the curve (*b*) of FIG. 7, and is clearly inferior to that of the novel magnetic head according to the present invention.

What we claim is:

1. A magnetic head assembly comprising a ferrite yoke having the shape of a modified annular cylinder having a plane of symmetry which divides said modified cylinder as a whole into two identical mirror symmetrical parts, a central bore, the axis of which is included in said plane of symmetry, an airgap extending between the outer annular surface and said central bore of said cylinder and along said plane of symmetry at one side of the wall of said cylinder, and an oblique flat surface intersecting the flat end surface at one end of said cylinder on a line lying between the outer and inner peripheries of said cylinder, and on the same side of the axis of said central bore as said airgap, said oblique flat surface intersecting the other flat end surface on a line lying between the axis of said central bore and the outer periphery of said cylinder on the opposite side of said axis from said airgap; a pair of pole pieces attached to said oblique flat surface at said airgap and defining between them a nonmagnetic gap including said plane of symmetry; and a winding around said ferrite yoke.

2. A magnetic head assembly as claimed in claim 1 in which said central bore is coaxial with said outer periphery.

3. A magnetic head assembly as claimed in claim 1 in which said central bore is offset from the center of said outer periphery in a direction toward the airgap.

4. A magnetic head assembly as claimed in claim 1 wherein said pair of pole pieces consists essentially of a ferromagnetic metallic alloy.

5. A magnetic head assembly as claimed in claim 1 wherein said cylinder has a height larger than one-half of its outside diameter.

6. A magnetic head assembly as claimed in claim 5 wherein said cylinder has a height smaller than twice said outer diameter.